United States Patent
Garrett et al.

(10) Patent No.: US 11,687,742 B2
(45) Date of Patent: Jun. 27, 2023

(54) TWO PIECE DUAL LAYER TRANSACTION DEVICE

(71) Applicants: Peter Garrett, San Francisco, CA (US);
Paul Lewis Regen, Felton, CA (US);
Tom Czepowicz, San Francisco, CA (US)

(72) Inventors: Peter Garrett, San Francisco, CA (US);
Paul Lewis Regen, Felton, CA (US);
Tom Czepowicz, San Francisco, CA (US)

(73) Assignee: EDGE MOBILE PAYMENTS LLC, Mill Valley, CA (US)

( * ) Notice: Subject to any disclaimer, the term of this patent is extended or adjusted under 35 U.S.C. 154(b) by 0 days.

(21) Appl. No.: 16/900,261

(22) Filed: Jun. 12, 2020

(65) Prior Publication Data

US 2020/0394370 A1    Dec. 17, 2020

Related U.S. Application Data

(63) Continuation-in-part of application No. 16/853,406, filed on Apr. 20, 2020.

(60) Provisional application No. 62/873,877, filed on Jul. 13, 2019, provisional application No. 62/860,742, filed on Jun. 12, 2019.

(51) Int. Cl.
*G06K 7/10* (2006.01)
*G06Q 20/34* (2012.01)
*G06K 9/00* (2006.01)
*H04W 4/80* (2018.01)
*C09J 7/30* (2018.01)
*H04W 88/02* (2009.01)

(52) U.S. Cl.
CPC ............ *G06K 7/10297* (2013.01); *C09J 7/30* (2018.01); *G06K 9/0004* (2013.01); *G06Q 20/341* (2013.01); *G06Q 20/352* (2013.01); *G06Q 20/353* (2013.01); *H04W 4/80* (2018.02); *H04W 88/02* (2013.01); *C09J 2203/326* (2013.01); *C09J 2483/00* (2013.01); *G06Q 20/3572* (2013.01)

(58) Field of Classification Search
None
See application file for complete search history.

(56) References Cited

U.S. PATENT DOCUMENTS

| | | | | |
|---|---|---|---|---|
| 7,819,321 | B2 * | 10/2010 | Faith | G06Q 20/367 235/441 |
| 10,176,414 | B1 * | 1/2019 | Koeppel | H02J 7/0044 |
| 2017/0267898 | A1 * | 9/2017 | Singla | G06F 3/03545 |

* cited by examiner

*Primary Examiner* — Kristy A Haupt

(57) ABSTRACT

A two part dual layer transaction device comprising a computerized master unit powered by rechargeable battery, the master unit capable of connecting wirelessly to a data network and accessing at least one network server, the master unit having a length, a width, and an internal volume, and a transaction card element having a form factor acceptable for use as a debit or credit card, wherein the transaction card element may be docked or otherwise coupled to the master unit in an idle state and may be uncoupled by the user for the purpose using or cleaning the card element.

10 Claims, 8 Drawing Sheets

TWO PIECE DUAL LAYER TRANSACTION DEVICE

CROSS-REFERENCE TO RELATED DOCUMENTS

This US non-provisional patent application is claiming priority as a continuation in part (CIP) to US non-provisional co pending application Ser. No. 16/853,406 filed on Apr. 20, 2020. The entire disclosure of the above referenced application is included herein at least by reference. This US non-provisional patent application is also claiming priority to co pending provisional patent application Ser. No. 62/860,742, filed on Jun. 12, 2019. This US non-provisional patent application is also claiming priority to co pending provisional patent application Ser. No. 62/873,877, filed on Jul. 13, 2019.

BACKGROUND OF THE INVENTION

1. Field of the Invention

The present invention is in the field of financial transacting and pertains particularly to methods and apparatus combining access to multiple debit and or credit accounts from a single computerized transaction device.

2. Discussion of the State of the Art

Payment cards are part of a payment system used by financial institutions like banks, for example, to enable cardholders to access funds held in designated bank accounts or credit accounts. The cardholder may make payments by electronic funds transfer (EFT) and access automated teller machines (ATMs). There are several types of payment cards in the art, perhaps the most common classes being credit cards and debit cards.

A more recent type of payment card existing in the art is generally termed a smart card in the art. Smart cards are payment cards that contain a unique card number and some security information such as an expiration date or card verification value (CVV) and a magnetic strip and an embedded euro-pay master card and visa (EMV) chip (secure element) enabling various machines (transaction point terminals) to read and access information from the card.

More recently, smart cards have been adapted as mobile dynamic smart transaction cards. A dynamic smart card may have multiple payment card data dynamically loaded onto the single form factor of the card. A user may add any or all payment card data from debit, credit, and loyalty accounts to a mobile application associated with the smart card. The user may load the data onto the smart card via Bluetooth wireless technology.

All-in-one smart cards are referred to in the field as dynamic smart cards. An owner of a dynamic smart card may load multiple payment account data sets onto a single payment card form factor. A user may add payment card data sets for debit, credit, gift, and loyalty to the dynamic smart card. For example, the user may leverage a mobile phone application (executed on phone) associated with the dynamic smart card to authenticate (identity confirmation) and move the payment card data sets onto the dynamic smart card over a Bluetooth™ wireless network connection between the user's smart phone and the dynamic smart card.

Currently financial institutions enable the use of a dynamic smart card for proxy representation of other payment cards if the card is limited to the data being written onto a mag stripe memory. These cards must not include static euro-pay master card and visa (EMV) chip sets or near field communication (NFC) chip sets. Another limitation is that financial institutions will not allow for dynamic EMV or NFC chips to be included on a dynamic smart card.

EMV is a chip set adapted to store secure payment information from contact less credit cards. EMV is a reliable standard for transacting over a network. Payment information stored on an EMV chip is difficult if not impossible to hack. EMV cards are typically termed chip cards in the art.

Financial institutions will allow for dynamic NFC transactions through network-hosted mobile wallet accounts like Apple Pay™ or Android Pay™. However, the number of users remains small because consumers are not rapidly adopting Smart phone-based mobile wallet technology and market has been declining. As a response to the above, companies have developed a new type of mobile wallet/smart card that is adapted as debit card associated to a bank account or to an automated clearing house (ACH) account. This new card has a unique card number of 15 or 16 digits supported by a major payment network such as MasterCard or Visa, etc.

To enable an Internet of Things (IoT) Smart card mobile wallet function, the user must first setup a cloud wallet account through a web site or through the associated smartphone application. The user may upload all payment card data including debit card data, credit card data, loyalty card data, and so on. The user may connect to their cloud wallet account from their IoT Smart card after the user has setup and activated the cloud wallet account. This smart card may utilize the user's Smart phone internet connection over wireless fidelity (WiFi) or cellular network. The IoT Smart card performs as a proxy agent for other payment card accounts stored in the users cloud wallet account. A user may select a payment card from the IoT smart card utilizing a digital screen with input and display capability whereby the card communicates the selection to the smart phone via wireless connection the selected card identified in the user's cloud wallet account. The IoT payment card may be used to fund a transaction at a merchant point of sale (POS) terminal. Accounting is provided in real time relevant to the cloud wallet account being used to fund the IoT smart card transaction. The IoT Smart card 16-digit debit card number serves as the proxy card number for completing the POS transaction.

The inventor is aware of a computerized transaction card provided in a plastic form factor resembling a credit card. The form factor includes all or a combination of a magnetic stripe, a Euro-pay master card and visa (EMV) chip, and a near field communication (NFC) chip. The card has at least one micro-controller powered by a rechargeable battery and at least one wireless communications chip set for sending and receiving data over a local wireless network. The card is known to the inventor as a computerized hybrid mobile transaction card. The mobile card includes an interactive display screen for displaying information to a card operator.

The card referred to as a hybrid computerized mobile smart card is adapted to function as a static contact smart card with access to a cloud-based digital wallet account and to function as a dynamic contact-less smart card. The card may also function as an automated clearing house ACH or bank-issued debit card. The smart card known to the inventor and referenced in this specification has a mobile wallet interaction capability including the ability of the user to select other payment cards from a network-hosted cloud wallet account to use for merchant transactions involving mag stripe or EMV chip.

The inventor is further aware of a computer telephony integrated (CTI) mobile transactional and communications device having a first physical layer of electronic components adapted to fit in a first rectangular housing, the components adapted in aggregate to function as a mobile CTI communications device capable of accessing a wireless mobile network, and a second physical layer of electronic components adapted to fit in a second rectangular housing having a same or similar length and width as the first rectangular housing, the second housing having less internal volume defined by a uniform thickness, the components adapted in aggregate to function as a mobile smart card capable of accessing a financial network to perform transactions and manage accounts.

The first and second housings are adapted to be coupled together and uncoupled for POS transactional use. The separate housings are coupled together in one case via a plurality of contact pads distributed in like number and geometric pattern to interfacing sides of the first and second housings. The contact pads may be magnetized to attract opposing contact pads to couple the first and second housings together along the interfacing sides forming the assembled or coupled device.

It has occurred to the inventor that the separate components of the mobile device comprising the static smart card and the parent communications device might be paired or coupled together in one or more ways that may be more convenient and more secure than simply touching magnetic contacts together. Moreover, improvements in preservation of device integrity and shelf live are also needed.

BRIEF SUMMARY OF THE INVENTION

DETAILED DESCRIPTION OF THE INVENTION

In various embodiments described in enabling detail herein, the inventor provides a unique system fully functional dual layer universal ultra smart card. The present invention is described using the following examples, which may describe more than one relevant embodiment falling within the scope of the invention.

Figure 1:
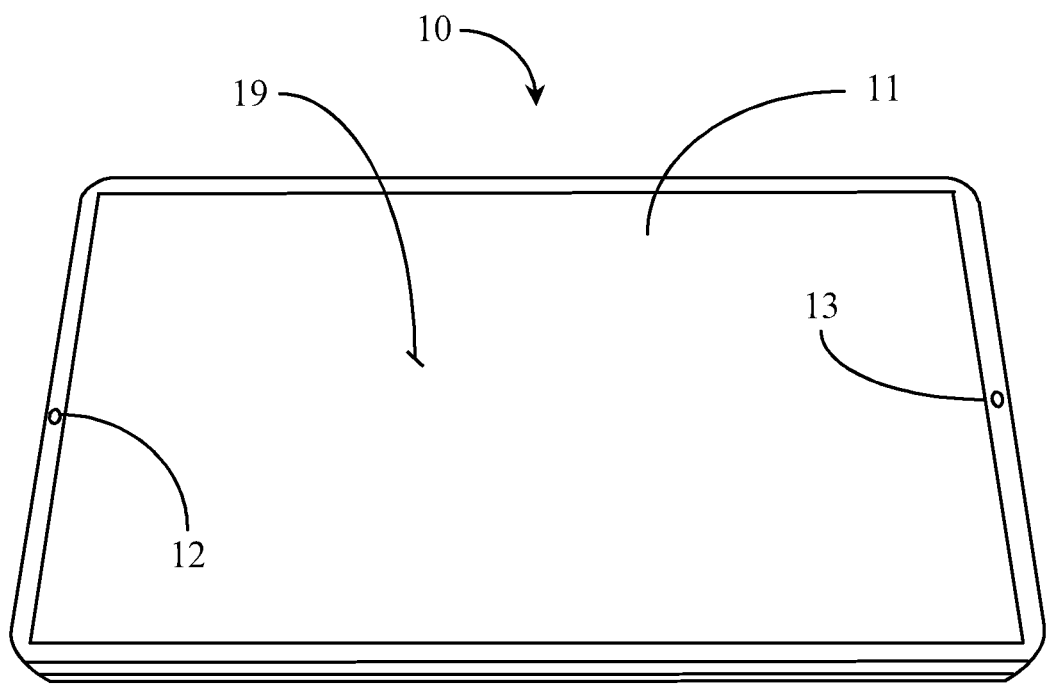
FIG. 1 is a perspective view of a master unit of a dual layer smart card/phone according to an embodiment of the present invention.

FIG. 1 is a perspective view of a master unit representing one half of a dual layer smart card/phone 10 according to an embodiment of the present invention. A master unit (MU) 11 is adapted as one layer of dual layer smart card/phone 10 and may be separated from a slave unit representing the other layer of dual layer device 10. Both layers are coupled or otherwise connected to form one electronic device referred to herein as device 10.

MU 11 has a touchscreen display 19 covering the entire footprint of device 10 on that side of the device. Touch screen display 19 may be supported by internal circuitry and software and may be used to interact with media, execute transactions, browse the Internet, perform video calls and the like. MU 11 includes at least two electronic microphones, a microphone 12 and a microphone 13. Microphones 12 and 13 may be adapted to cancel background noise when a user is operating device 10 for use in communications, reviewing media including audio, or interacting with application called interfaces resident on the device.

MU 11 may include the aggregate of the electronics available to device 10, which includes the slave unit. MU 11 may include at least one master control unit (MCU) powered by a rechargeable battery. Display screen 19 may be used in conjunction with at least one application to select a user's preferred means of multiple payment options and to enable the user an interface to accept payment from other users over the mobile network.

In one embodiment, screen 19 may be interacted with to unlock or lock the MU 11 or the slave unit coupled to it to form device 10. One primary function of MU 11 is to house a plethora of aggregated financial technologies that would not otherwise fit a credit card form factor. MU 11 may include circuitry and software supporting a variety of wireless communications technologies like Bluetooth, Wi-Fi, and other Long-Term Evolution (LTE) type wireless technologies lending to adaptation as a smart device. MU 11 may be adapted with smart phone technologies enabling communications over a mobile network for voice, video, and data processing. LTE type technologies are not necessarily required if MU 11 is adapted as a smart phone.

Figure 2:
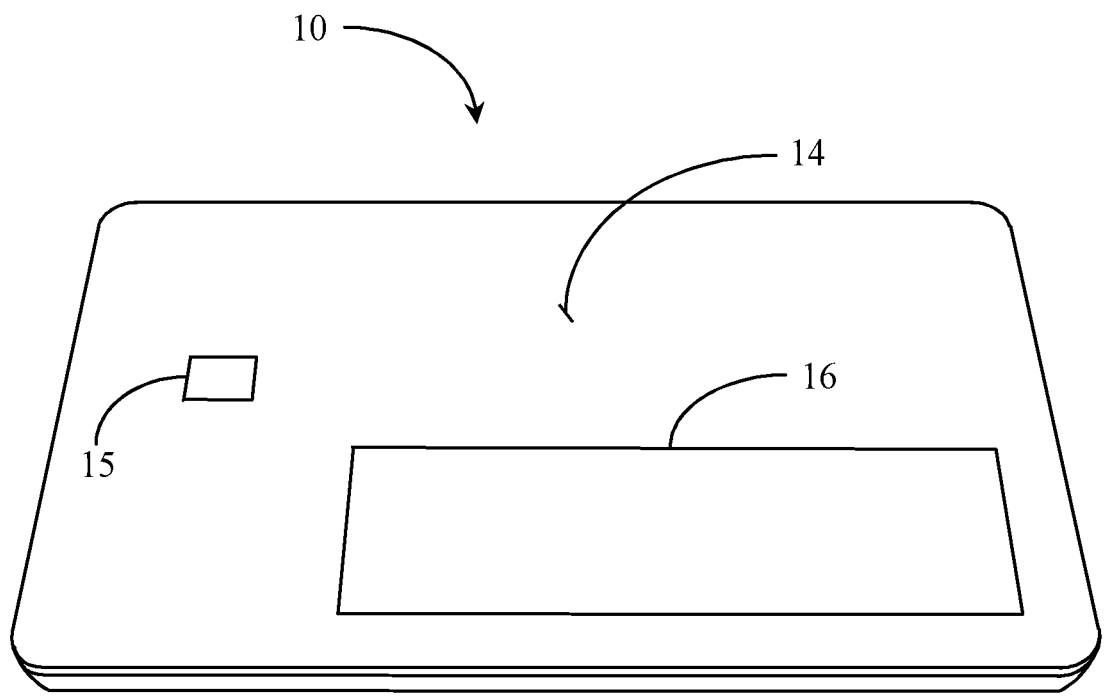
FIG. 2 is a perspective view of a slave unit of a dual layer smart card/phone according to an embodiment of the present invention.

FIG. 2 is a perspective view of a slave unit representing one half of a dual layer smart card/phone 10 according to an embodiment of the present invention. A slave unit (SU) 14 is adapted as one layer of dual layer smart card/phone 10 and may be separated from the master unit (MU) 11 representing the other layer of dual layer device 10. Both layers are coupled or otherwise connected to form one electronic device referred to herein as device 10.

In this view, dual layer device 10 is turned over to depict the SU 14. SU 14 is adapted to function as a universal credit/debit/gift-card device that may be coupled to the master unit. SU 14 includes a smaller display screen 16. Display screen 16 may display feedback and confirmation indicia that a credit or transaction card the user has selected from multiple possibilities programmed into the MU 11 is in fact the card programmed and enabled at the SU 14. SU 14 is enabled to access and exchange through Euro pay MasterCard and Visa (EMV) terminals and includes EMV contacts 15.

The dual layer device 10 comprises the MU 11 and the SU 14 coupled together. The MU 11 may be one of several power sources that may be available to charge and to program the thin credit card-sized portion of device 10, more particularly SU 14. SU 14 is adapted in this embodiment to meet all technical specifications that may be required for the card to function independently from and while connected to MU 11 as a smart card enabling all credit, debit, and gift cards that are standard in the market to be accepted and accessible for transaction.

Figures 3A, 3B:
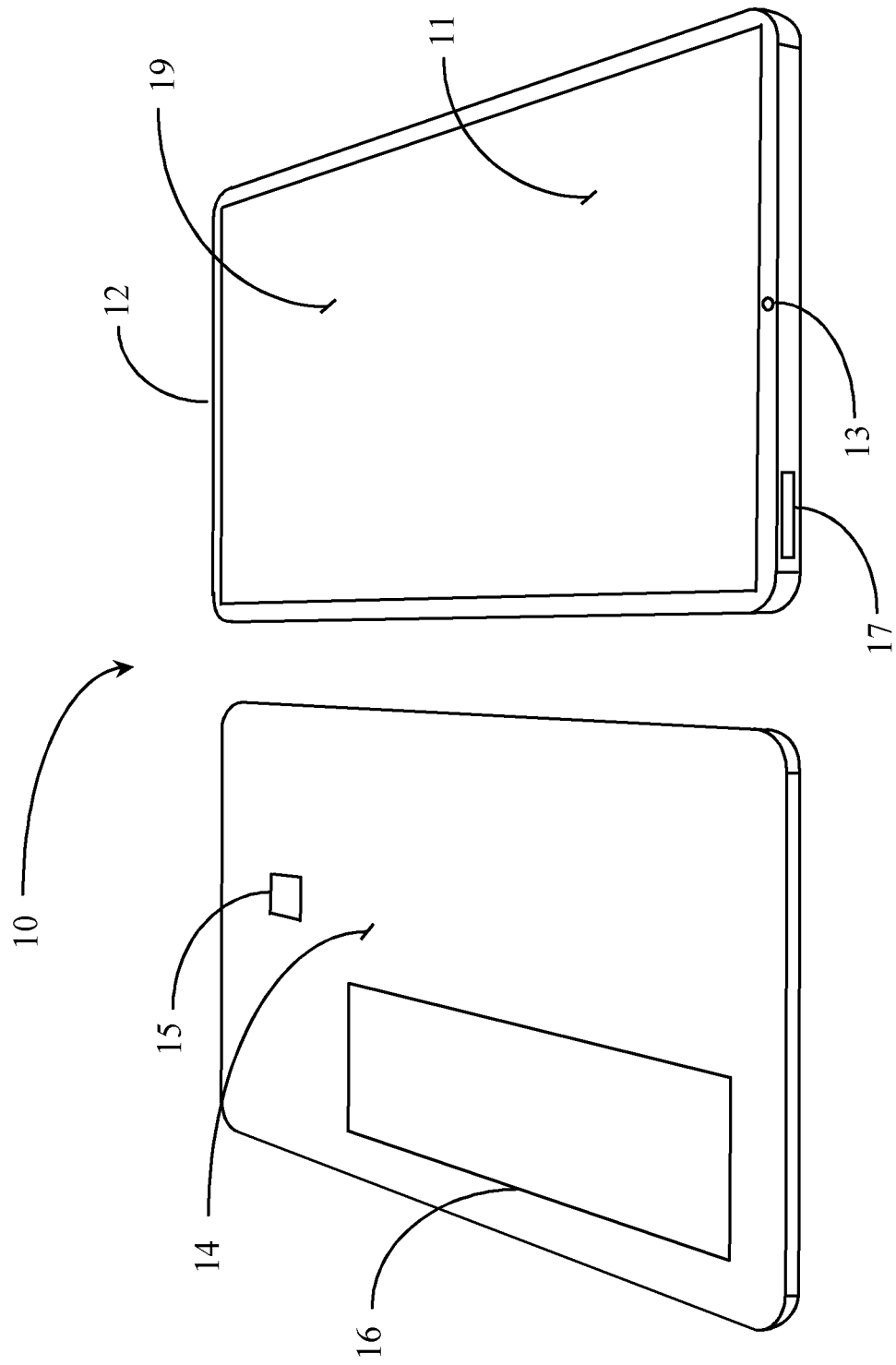
FIG. 3A is a perspective view of the slave unit of FIG. 2 depicting the side including a display screen.
FIG. 3B is a perspective view of the master unit of FIG. 1 depicting the side including a display screen.

FIG. 3A is a perspective view of slave unit 14 of FIG. 2 depicting the side including a display screen. SU 14 is contained in a very thin space compared to the thicker MU 11 containing the host electronics and wireless communications technologies. SU 14 is depicted here with the same elements depicted in FIG. 2, more particularly screen 16 and EMV contact box 15.

FIG. 3B is a perspective view of the master unit of FIG. 1 depicting the side including a display screen. MU 11 understandable is contained in a thicker space compared to SU 14 because of the electronics including the controller and battery. Device 10 may have a combined layer thickness comparable to a typical thin android device with a similar width and length dimension profile. MU 11 includes a speaker device 17.

Figure 4B:
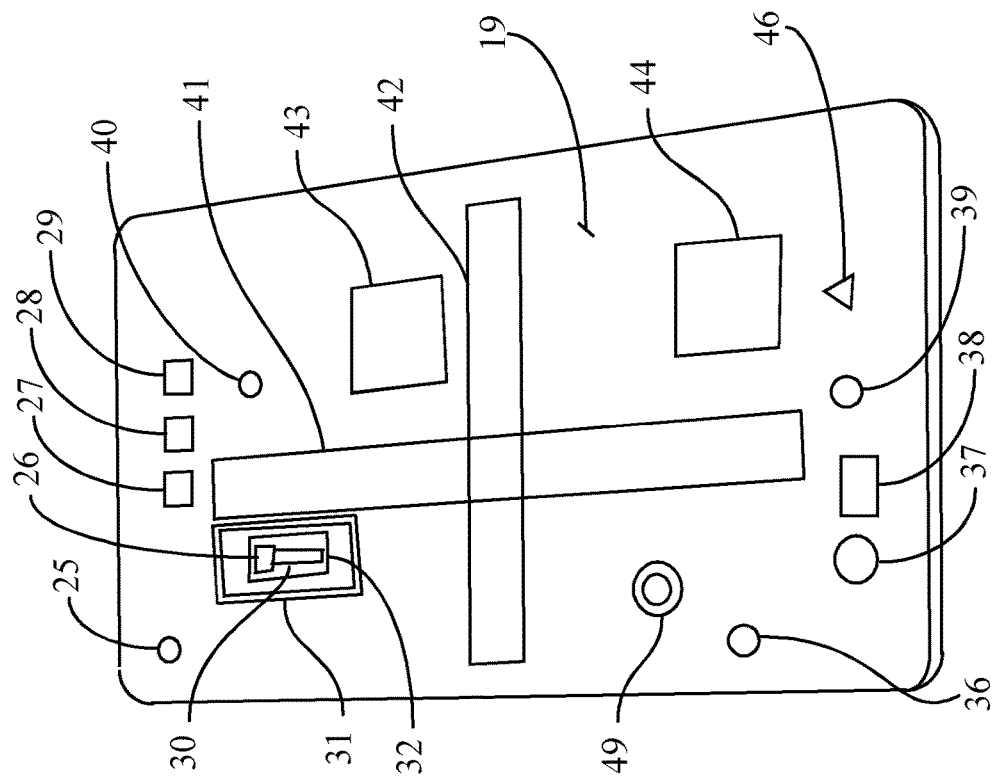
FIG. 4B is a perspective view of the master unit of FIG. 3B depicting the side that interfaces with the slave unit.
Figure 4A:
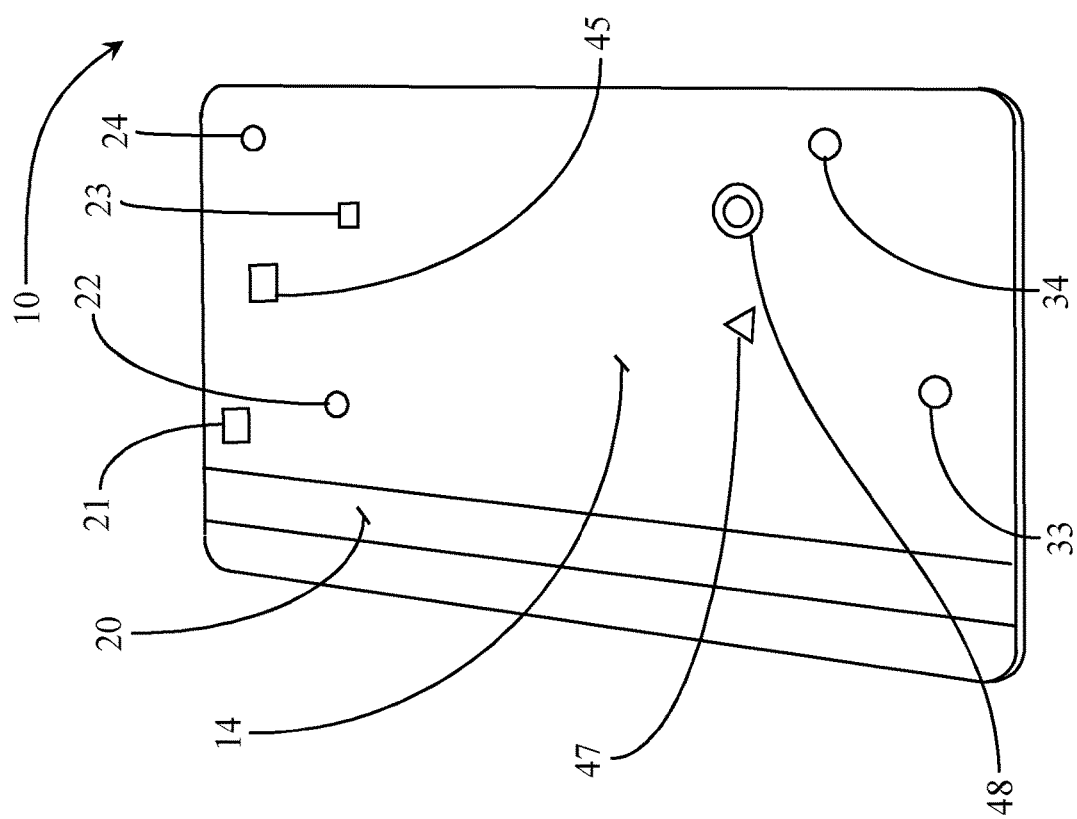
FIG. 4A is a perspective view of the slave unit of FIG. 3A depicting the side that interfaces with the master unit.

FIG. 4A is a perspective view of slave unit 14 of FIG. 3A depicting the side that interfaces with the master unit. FIG. 4B is a perspective view of the master unit 11 of FIG. 3B depicting the side that interfaces with the slave unit.

Referring to FIG. 4A, SU 14 of device 10 includes a magnetic stripe 20. Magnetic stripe 20 typically holds the static data for a payment card or credit card. In one embodiment, magnetic stripe 20 has writable memory in addition to the memory required for static data. In this case dynamic data may be added to stripe 20 using a data writer.

SU 14 may include a near field communication (NFC) wireless component 21. NFC component 21 may transfer dynamically held data and may transfer dynamic data that is written to memory. In one embodiment, SU 14 includes a plurality of contact points that may be magnetic or may be magnetized to hold SU 14 against MU 11 that may include the same pattern of contact points. In this embodiment, contact points 22, 24, 33, and 34 are provided. Contact points just mentioned may be made of any conductive material such as iron or any other material that conducts electricity and may attract in a magnet field enough to hold the two device layers, MU 11 and SU 14 together.

In one implementation, contact points 22, 24, 33 and 34 may be connected to an electromagnetic coil connected to a micro circuit that can reverse magnetic poles of the contact points on command to cause magnetic resistance for the purpose of intentionally decoupling the SU 14 from the MU 11. Such a commend may be executed by voice, touch screen interaction, programmed button, or dedicated physical switch without departing from the spirit and scope of the present invention.

SU 14 includes an optical data transceiver 23 that communicates with an optical transceiver 26 held on the interfacing side of MU 11. Optical data transceivers 23 and 26 are adapted to pass data back and forth between SU 14 and MU 11. Optical data transceivers are adapted to minimize electromagnet radiation emanating from the two layers of device 10 when data is transferred between SU 14 and MU 11 improving security. SU 14 includes a Bluetooth transceiver 45 adapted to process Bluetooth signal from MU 11.

Referring to FIG. 4B, MU 11 includes a shield conductor 30 that is adapted to prevent any data leaks between the optical transceiver 26 held on MU 11 and the optical transceiver 23 held on SU 14. MU 11 includes a radio frequency (RF) leak detector 31 adapted to detect leaks in RF transmission and to detect RF attempts to hack device 10 while in use. Leak detector 31 may provide triggered data feedback to a signal processor 43 on MU 11. Signal processor 43 is capable of generating a phase shift in RF frequency to 180 degrees to cancel out the active RF signal rendering it undetectable to a device attempting to hi-jack or intercept data or from hacking into the device to extract proprietary information. An RF cancellation signal may be propagated from detector 31 to a receiving component 32.

MU 11 includes a ghost writer component which may be attributed to component 31 or component 32 or both wherein the component is further adapted to introduce misleading or false data in transmission to an unknown device that has hijacked a connection and attempting to intercept data from the device. Misleading data or "ghost data" may also be transmitted during normal back and forth transmission of data between MU 11 and SU 14. In one implementation, both components 31 and 32 may detect RF leak, RF interference, may trigger phase shift signals, and may emit ghost data or misleading information to the unknown device.

Referring to both FIGS. 4A and 4B, contact points 22, 24, 33, and 34 on SU 14 of FIG. 4A match up in alignment with contact points 25, 40, 39 and 36 on MU 11. An option may be to transmit data using two or more of the contacts in addition to the contacts being magnetic coupling points for the two device layers SU 14 and MU 11. In one implementation, a hybrid approach to sending and receiving data between SU 14 and MU 11 may be observed where optical data transmission is handled separately from textural data simultaneously for a message or command, wherein the received data is matched for parsing after receipt at two locations on the receiving layer.

Device 10 may operate like a typical communications device and may include many or any of the traditional android applications for messaging, email, browsing, conferencing, maps, calendar, and so on. Referring to FIG. 4B, MU 11 includes a two-channel Bluetooth transceiver 27 that communicates with Bluetooth transceiver 45 held on SU 14. Bluetooth is supported and defined by an application resident on MU 11 the application also afforded to and resident on SU 14 rendering both layers Bluetooth capable devices functioning as nodes on a Bluetooth network.

In one implementation, Bluetooth signal strength may be used to determine how far away one layer of device 10 may be from the other layer of device 10. If too far one or both device layers may emit an audible alert, a vibratory alert, or may send an automated message via an alternative communications channel that a user may have lost or become separated from one layer of device 10 while the device was decoupled.

In one implementation, a phase detection antenna may be provided and supported on one or both layers of device 10. A phase detection antenna may determine the origin of an alert signal for use in detecting where the other layer is located. Using a dedicated signal generator and detector may be more economic than using Bluetooth signal, which may become weak at higher distance. In one embodiment, a Global Positioning Satellite (GPS) module may be added to SU 14 and to MU 11 to aid in device layer location and typically device location of device 10 when coupled.

Referring to FIG. 4B, Bluetooth transceiver 27 may include a dedicated channel or mode for listening to music or to audio of a telephone conversation through a Bluetooth headset. MU 11 includes a wireless fidelity (WiFi) module 28. WiFi module 28 enables device connection to and communication over the Internet using WiFi. MU 11 includes a long-term evolution (LTE) module 29 adapted to enable connection to an LTE network. In one embodiment communications preferences may be set relative to communications means like WiFi calling over LTE network calling, for example.

Referring to both FIG. 4A and FIG. 4B, layer SU 14 and layer MU 11 fit together, in one implementation using magnetized contact points 25, 40, 36, and 39 on MU 11 that align with and magnetically connect to the contact points 24, 22, 34, and 33 on SU 14. In one implementation, magnetic contact points may also serve as device layer charging pads for SU 14. In another implementation, the contact points may also be used as data channels for transferring data that may or may not be encrypted between layers of device 10.

Referring to FIG. 4B, MU 11 includes a camera 37 and a source of illumination like an LED light 38. Camera 37 may function as a camera for taking photos and videos and as an optical recognition device that can read cards, bar codes, and other symbol technologies. Light 38 may be used on demand to illuminate for camera 37 or simply to illuminate an area around the user.

Referring to FIGS. 4A and 4B, device 10 may include a triple axis (x y z) accelerometer distributed to both layers of device 10. An accelerometer may provide different purposes depending upon the application controlling the data produced by it. An accelerometer provides data for device orientation, device separation, acceleration forces on the device, angular direction of movement of the device, etc. In this implementation, a compass module 48 is provided on SU 14 and a corresponding compass module 49 is provided on MU 11. Either layer may determine NESW orientation or direction via the compass element. Device 10 may use one or the other compass element when the layers are coupled.

Referring to FIG. 4B, MU 11 includes an induction charging pad 44 supported by coil that may be used to charge SU 11 or NFC data transmission between layers of device 10. NFC may also be used to communicate as a layer, for example, MU 11 to another NFC capable device. In one embodiment, electronic strain gauges 41 and 42 are provided to MU 11 and arranged in a crisscross pattern. Gauges 41 and 42 are adapted to detect strain in the form of bend or deviation from a straight x axis and y axis. This might be accomplished using a capacitive or resistive technology.

In a variation to the above embodiment, gauges 41 and 42 provide or direct a generated voltage that may be used to charge SU 14. If the stress detection gauges 41 and 42 detect a predefined stress level above a threshold value, voltage might be generated or directed that may aid in mitigating ongoing physical stress to device 10. In a further variation of the embodiment, the generated voltage may trigger a motorized frame or support mechanism to deploy firming up the structure of the device and prevent a potentially irreversible failure of the device.

Figure 5:
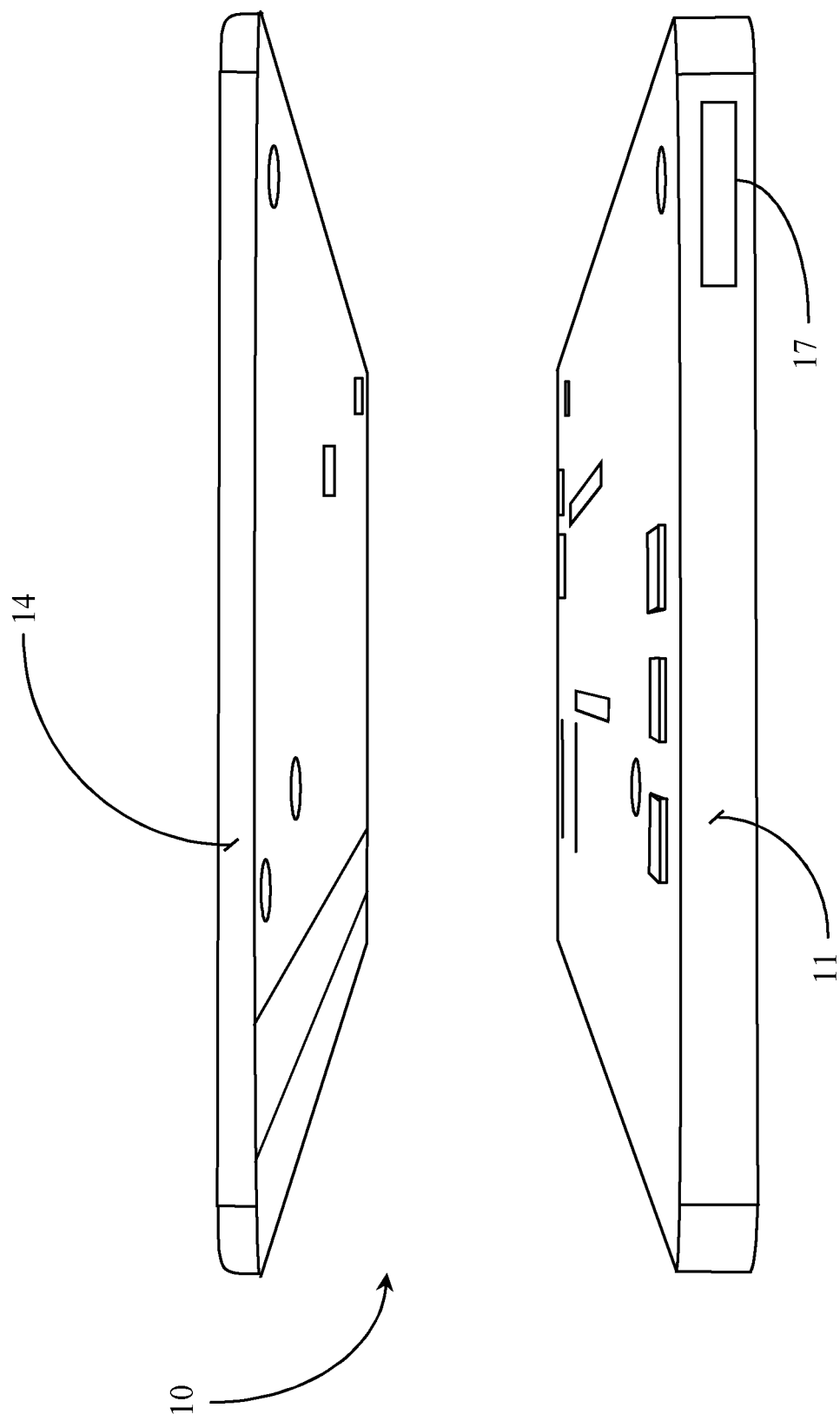
FIG. 5 is an exploded perspective view of the master unit and slave unit oriented for coupling.

FIG. 5 is an exploded perspective view of the master unit 11 and slave unit 12 of device 10 oriented for layer coupling to form device 10. In this view, SU 14 is the thin layer and MU 11 is the thicker layer of dual layer device 10. Speaker component 17 described further above is visible in this view on MU 11. Speaker component 17 may also be a vibrating element in one embodiment that may be used to alert the user of an incoming call or message or other form of alert or notification.

Sliding Fit Two-Part Card

Figure 6A:
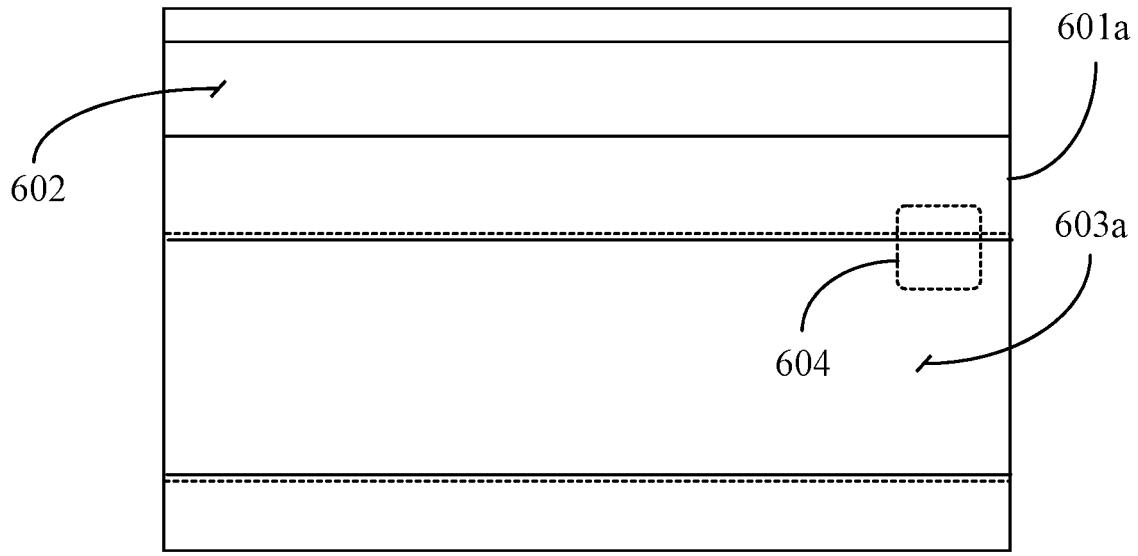
FIG. 6A is a plan view of a card portion of a dual layer transaction device depicting a slide-connect groove feature or attaching the card to the master portion of the device.

FIG. 6A is a plan view of a card portion of a dual layer transaction device depicting a slide-connect groove feature or attaching the card to the master portion of the device. In this view a card element 601a is depicted having a form factor of a typical debit card including a mag stripe 602. Card element 601a may be static card that is provisioned like a Visa or Master Card and may include an associated card number.

In a preferred embodiment card element 601a functions as a debit card but might also be another card type like a credit card without departing from the spirit and scope of the invention. Mag strip 602 may be on either side of card element 601a, but in preference it is on the side that interfaces with a master unit (MU) 601b depicted further below in FIG. 6B. Card element 601a includes an EMV chip 604 on the side opposite mag stripe 602 in this example. Like the mag stripe, the EMV chip 604 may be located on either side of card element 601a. In some embodiments, card element 601a appears like any other standard static card (credit or debit) and complies with ISO specifications. Standard card features not depicted in this view may include a signature line, a three-digit printed CVV code, and trademark logos.

Figure 6B:
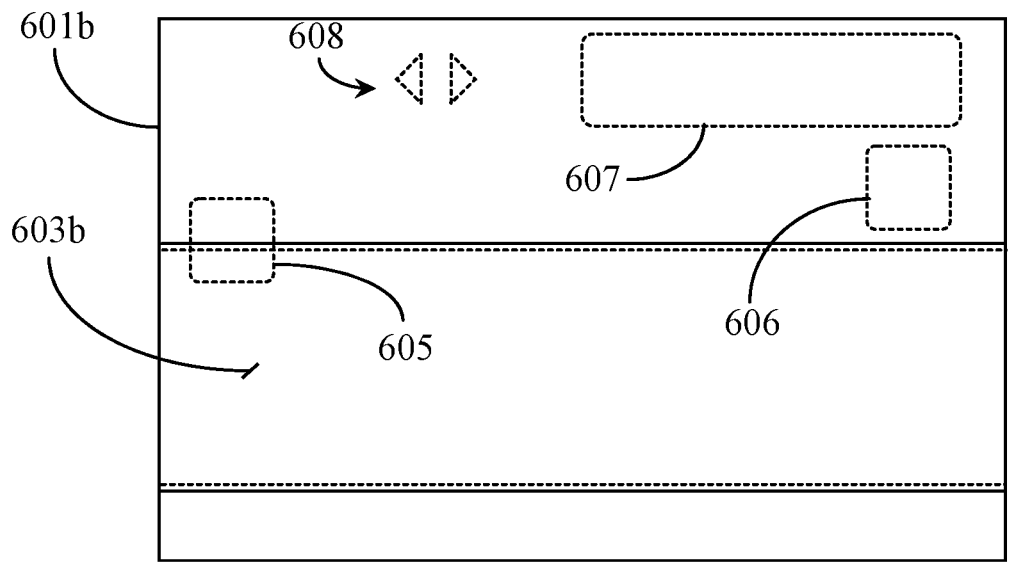
FIG. 6B is a plan view of a master unit portion 601b of the dual layer transaction device depicting a slide-connect raised feature for connecting card element 601a of 6A to the master portion of the device.

FIG. 6B is a plan view of a master unit portion 601b of the dual layer transaction device depicting a slide-connect raised feature for connecting card element 601a of 6A to the master portion of the device. Master unit 601b shares the same debit/credit card size form factor. In this embodiment, Master unit 601b is adapted with smart technology including communicating with a user's smart phone and accessing a cloud network through a user's smart phone. Unit 601b may be assumed to be the top dynamic smart side of the dual part transaction device. Unit 601b may include a near field contact (NFC) chip for NFC transaction as a POS terminal. Unit 601b may include a secure element (NFC) 606 adapted to contain multiple card data sets for use in transacting.

Master unit 601b includes a touch screen 607 for displaying which card or funding source will be used to perform a certain transaction. Screen 607 may also display other data resulting from other functionality. Master unit 601b may include physical indicia in the form of scroll buttons 608 for scrolling content displayed on screen 607 forward and backward. Touch screen functions may also enable scrolling without physical buttons. It is noted that master unit 601b may also include a memory, one or more microprocessors and associated circuitry enabling the electronic functions and task performance of the unit.

Referring to FIG. 6A, card element 601a includes a slide connect groove feature 603a extending horizontally across the card element. Feature 603a is a wide and shallow groove open at both ends. The edge walls of groove feature 603a are angle inward toward horizontal center. Master unit 601b includes a slide connect land feature 603b adapted with angled edge walls to slide into groove feature 603a such that both elements of the device are locked together to form the overall device. In one embodiment, screen 607 on master unit 601b may be modified to practice fingerprint detection technology. In one embodiment, master unit 601b may include a separate fingerprint pressure sensor 608 and associated firmware (not illustrated) for enabling fingerprint matching for security.

Figure 6C:
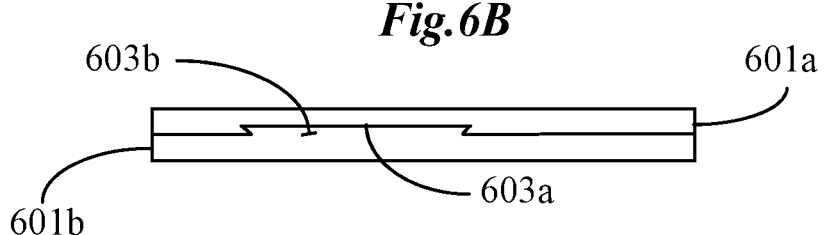
FIG. 6C is an end view of master unit 601b and car element 601a assembled by aligning the raised feature and groove feature and sliding the components together.

FIG. 6C is an end view of master unit 601b and car element 601a assembled by aligning the raised feature and groove feature and sliding the components together. In this embodiment, a user may use moderate frictional force to remove card element 601a from master unit 601b by sliding the card element out of the groove/land feature interface, use the card at a POS terminal, and then reassemble the device.

The major uniform width dimension of groove feature 603a of FIG. 6A may be the same as or just lager than the major uniform width dimension of raised feature 603b of FIG. 6B to achieve a frictional fit between the two elements that secures the elements together. In one embodiment, magnetic contact points (not illustrated) may be provided in combination with the interfacing features to help secure the two elements in proper alignment with one another while they are connected.

Press Fit Two-Part Card

Figure 7:
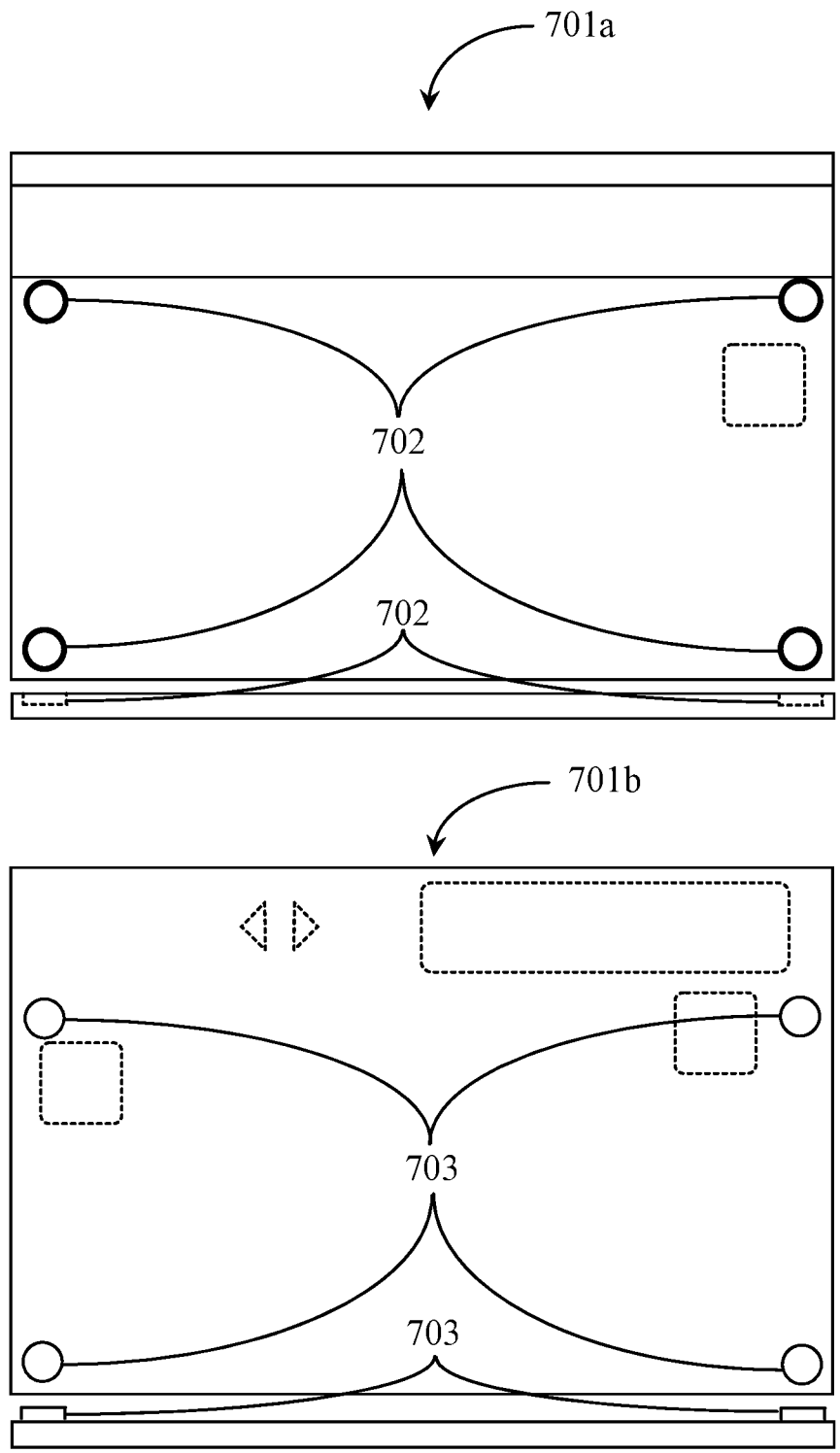
FIG. 7 is a plan view of a card element 701a and a master unit 701b of a dual layer transaction device in the form of a two-part card depicting a press fit interface for connecting the elements together.

FIG. 7 is a plan view of a card element 701a and a master unit 701b of a dual layer transaction device in the form of a two-part card depicting a press fit interface for connecting the elements together. Card element 701a may be analogous to card element 601a of FIG. 6A relative to form, electronics, and capability. In this embodiment card element 701a includes a pattern of blind holes referred to herein as post seats 702 provided on the interfacing side of the card element. Post seats 702 are uniform in diameter and depth and are adapted as post seats to seat a master unit 701b arranged in the same pattern of posts 703 of uniform diameter and height.

Post seats 702 may be arranged in any convenient symmetrical hole pattern and may include as few as two post seats without departing from the spirit and scope of the invention. There may be more than four post seats 702 without departing from the spirit and scope of the present invention. The placement patterns of post seats 702 and posts 703 match in alignment to align the device components into the same form factor however that is not a requirement to practice the invention.

In this example, the post seats 702 and posts 703 are annular in form, however they may be rectangular, square, triangular, hexagonal, octagonal, or other shapes without departing from the spirit and scope of the invention. In one embodiment, post seats 702 may include post seats of one shape and or diameter aligned with posts 703 of the same shape and or diameter, and post seats of an alternative shape or diameter aligned with posts of the same shape and or diameter to limit interface to one orientation between the components in alignment.

In a preferred embodiment the depth dimension of post seats 702 and the post height of posts 703 are the same so that the components may be snapped or pressed together with no gaps between the interfacing sides. In one embodiment, magnetic elements may be combined with the post seat/post interfaces to insure a sticky fit. In another embodiment, seats 702 may be snap seats and posts 703 may be snap posts without departing from the spirit and scope of the present invention. Therefore, card element 701a and master unit 701b may be pressed together or snapped together. In one embodiment, a coin or edge slot or slots may be provided in the side edged or the card element 701a so a tool may be used to pry the components apart when desired.

Electrostatic Attachment for Two-Part Card

Figure 8:
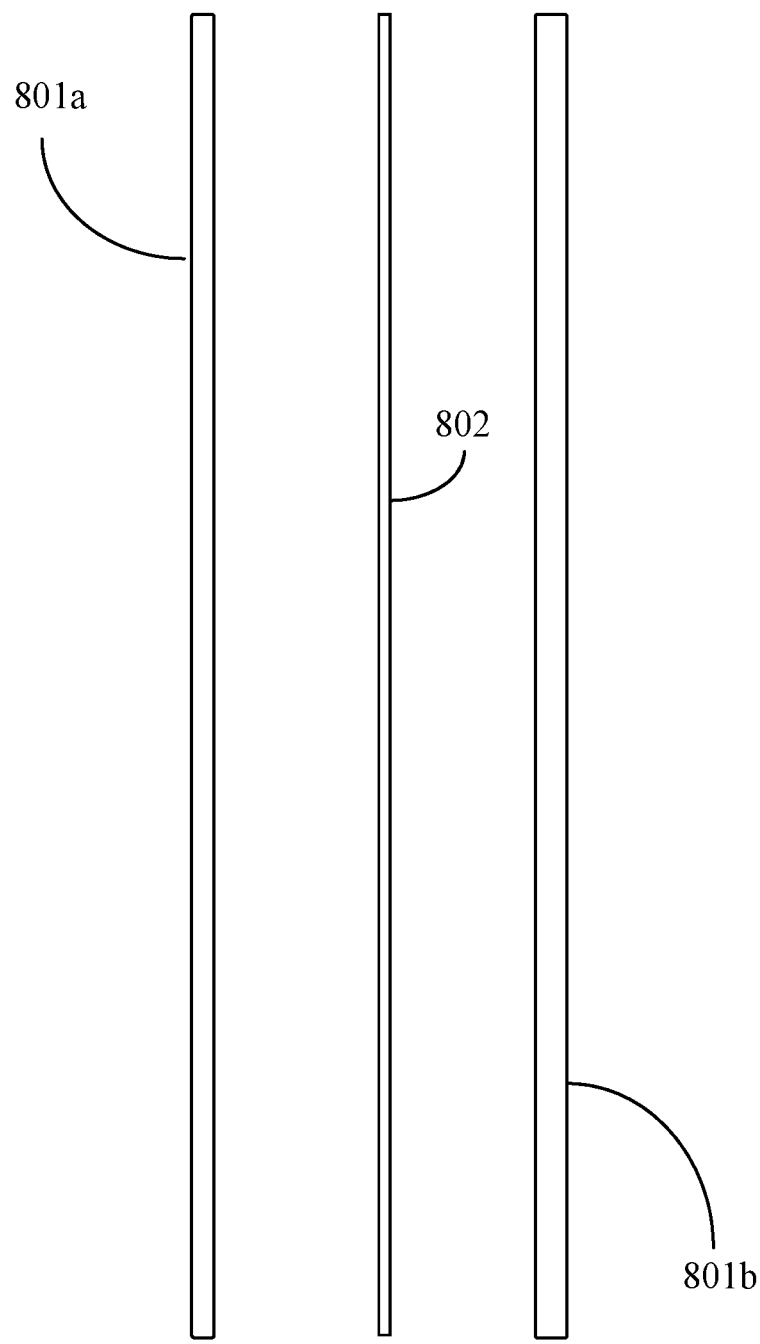
FIG. 8 is a side view of a card element 801a and a master unit 801b of a dual layer transaction device in the form of a two-part card depicting an invention and a way of connecting the two parts.

FIG. 8 is a side view of a card element 801a and a master unit 801b of a dual layer transaction device in the form of a two-part card depicting an electrostatic connection means. In one embodiment, the inventor provides an electrostatic means for attaching a card element 801a and a master unit 801b. A hydrophilic substance is a substance tending to mix with, dissolve in, or be dampened by water.

Self-assembly is not widely practiced in industrial microfabrication procedures. The inventor has determined that it could potentially involve assembly processes that are considerably less complex. A variety of procedures for aligning and connecting separate parts have been researched and investigated in the art. These procedures mainly utilize capillary, gravitational or electrostatic forces in micro-scale to achieve the purpose. One of these methods is involving alignment of parts by utilizing the surface tensions of micro-scaled adhesive films, which are selectively coated on hydrophobic alignment structures.

Referring to FIG. 8, card element 801a and master unit 801b may be aligned and held together by electrostatic attraction to a silicone membrane 802 adapted as a micro-scaled adhesive film situated between the parts 801a and 801b. Several complementary and electrically conductive micro-structured patterns may serve as binding sites for the alignment of parts 801a and 801b in this approach.

The inventor has determined through empirical evidence that the layout of the alignment micro-structures and the size (length and width) of the parts were identical for both described concepts (film, no film) in experimental testing. In one embodiment there is no silicon membrane 802 and the parts are aligned and held together by electrostatic means through conductive microstructures interfacing to achieve the alignment and attraction force. Accurate parts alignment and sufficient electrostatic attraction forces were observed. In the embodiment using no film or membrane, parts with micro-structured binding sites as small as 10×10 µm2 could accurately be self-aligned with electrostatic attraction.

In other embodiments, card element 801a and master unit 801b may be held together in at least rough alignment within a dimensional tolerance range using one of several means known in the art for holding or grouping together two or more items in rough alignment. These apparatuses might include gecko clips, one or two corner pocket holders, large size paper clip holder, or a silicone rubber band holder.

Figure 9:
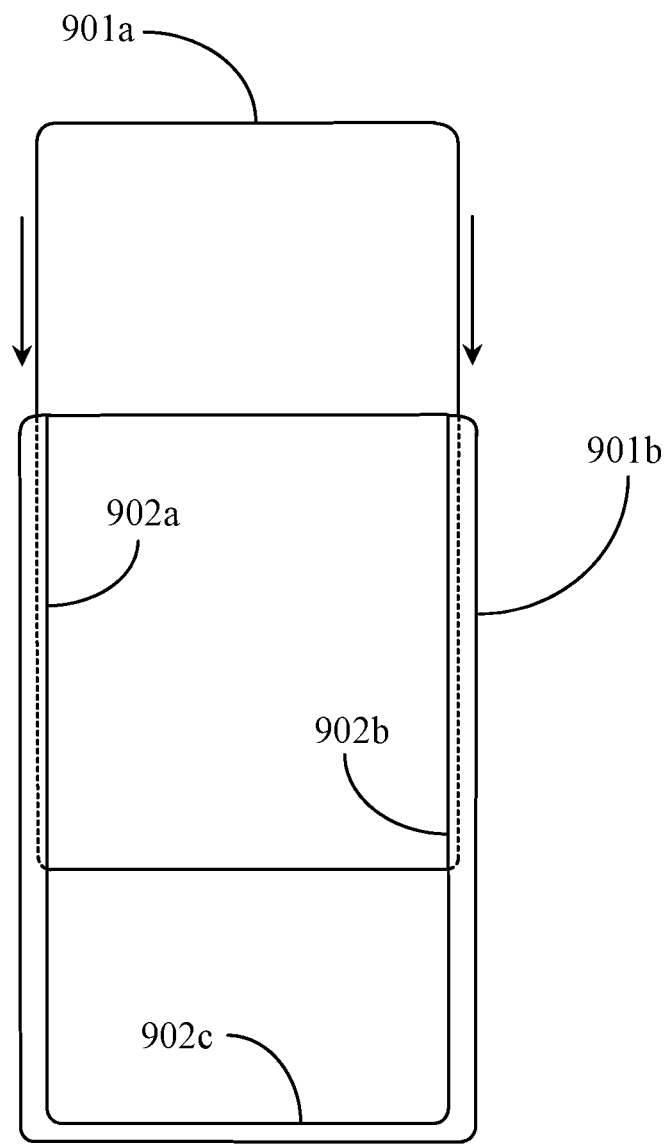
FIG. 9 is a perspective view of a two-part card of the present invention and a way of connecting the two parts.

FIG. 9 is a plan view of a dual layer transaction device according to another embodiment of the invention. In this embodiment, card element 901a is adapted to be contained within a master unit 901b modified to contain the card element in a sleeve architecture including a left track 902a, a right track 902b, and a track bottom 902c.

Card element 901a is analogous to the previous card elements described above and may include a static mag stripe, an EMV chip, an, in some cases, an NFC chip, the card associated with an ACH supported account. Master unit 901b may be analogous in capabilities to the previous master units described above and may include NFC chip capability, micro-controllers and circuitry enabling communication with a smart phone or other communications device and platforms. Master unit 901b is modified only slightly from previous units described in that it may contain the card element in a sleeve as the architecture as depicted.

A user may insert card element 901a into the sleeve architecture according to the direction of the arrow. Full insertion brings card element down to bottom 902c of the sleeve architecture. Master unit 901b may be equipped as other described units having a fingerprint sensor in one embodiment, a card selection mechanism and touch screen among other features previously described above. In a preferred embodiment, the dynamic NFC secure element on the card element is the part of the hybrid card that holds data as any mobile wallet would and is NFC capable so that anytime NFC is available it may be used without incurring more than one transaction fee.

Further to the above, card element 901a may be analogous to and not modified from any of the card elements described in this specification. Master unit 901b may be adapted with a memory, one or more microprocessors, circuitry to operate on-board electronic components of the unit including the screen, and input control or scroll buttons. Unit 901b may also include secure and dynamic NFC capability and all functions previously described above.

It will be apparent to the skilled person that the arrangement of elements and functionality for the invention is described in different embodiments in which each is exemplary of an implementation of the invention. These exemplary descriptions do not preclude other implementations and use cases not described in detail. The Uses and methods depicted within this description are purely emblematic of definitive ways in which to build and operate this invention and are not to be understood to be limiting of scope in any way. While the uses and methods have been described with a certain degree of particularity, it is to be noted that many alterations could be made in the details of the construction and the arrangement of the apparatus and its components without departing from the spirit and scope of this invention. It is implied that the uses and methods are not limited to the examples represented in this specification for the purpose of clarification and persuasion. The invention is limited only by the breadth of the claims below.

The invention claimed is:

1. A two-part dual layer transaction device comprising:
   a computerized master unit powered by rechargeable battery, the master unit storing a plurality of aggregated financial transaction accounts in datasets and capable of connecting wireles sly to a data network and accessing at least one network server, the master unit having a housing with a length, a width, forming at least one planar side and an internal volume;
   a transaction card element having a rectangular planar form factor having a first planar surface and a second planar surface, acceptable for use as at least one of a debit card and a credit card; wherein the transaction card element is coupled to the master unit in an idle state and may be uncoupled by the user for the purpose of using the card element in a physical financial transaction;
   wherein the master unit and transaction card are attracted to and held adjacent to one another via aligned electrostatic micro-structures provided by a silicon film between the at least one planar side of the housing and all of the planar surface of either the first or second planar surfaces, and at least one dataset is transferred to the transaction card thereby enabling the transaction card to physically accomplish a financial transaction at a financial terminal.

2. The transaction device of claim 1, wherein the wireless network is one of a wireless fidelity network (WiFi) and a long-term evolution (LTE) network.

3. The transaction device of claim 1, wherein the master unit and transaction card element may exchange data over at least one of a Bluetooth wireless network connection and a near field connection 20 (NFC).

4. The transaction device of claim 1, wherein the transaction card element unit may transact via a magnetic stripe at point of sale terminals with EMV EVM.

5. The transaction device of claim 1, wherein the transaction card element may transact via NFC at point of sale terminals with NFC.

6. The transaction device of claim 1, wherein the master unit and transaction card element are physically aligned and snapped together via snap seats and snap posts.

7. The transaction device of claim 1, wherein the master unit and transaction card are physically aligned, and press fit together via post seats and posts.

8. The transaction device of claim 1, further including two or more aligned micro-structure arrays adapted as binding sites to each side of the silicone membrane.

9. The transaction device of claim 1, wherein the master unit includes a sleeve track architecture sized to accept docking by slot insertion of the transaction card element.

10. The transaction device of claim 1, further including an optical fingerprint reader on the master unit.

* * * * *